Patented Nov. 16, 1943

2,334,162

UNITED STATES PATENT OFFICE 2,334,162

PREPARATION OF 2-AMINO-1,3,5-TRIAZINE

Jackson P. English, Stamford, and Joseph H. Paden, Glenbrook, Conn., assignors to American Cyanamid Company, New York, N. Y., a corporation of Maine No Drawing. Application July 31, 1942, Serial No. 453,040

5 Claims. (Cl. 260—249.5)

This invention relates to an improved method for preparing 2-amino-1,3,5-triazine. More particularly it relates to a method of preparing 2-amino-1,3,5-triazine by reacting formyl guanidine with formamide.

The only method for the production of 2-amino-1,3,5-triazine which we have knowledge of having been used in the past is one wherein cyanuric chloride is reacted with ammonia and subsequently treated with hydriodic acid and phosphorus. This prior art method is entirely unsatisfactory for commercial production and is technically undesirable in that it utilizes the extremely difficult reduction step employing hydriodic acid and phosphorus.

In accordance with the present invention we have discovered that 2-amino-1,3,5-triazine can readily be prepared by a process involving a reaction between formyl guanidine and formamide.

It is an advantage of the present invention that this process avoids the poor yield and difficult reduction process accompanying the previous cyanuric chloride process. It is also an advantage of the present invention that the reaction can be carried out in ordinary and readily available equipment to result in the production of 2-amino-1,3,5-triazine in satisfactory commercial quantities.

The invention will be described in greater detail in conjunction with the following specific example, which, however, is merely illustrative of the preferred method of preparing representative compounds of the class and is not intended to limit the scope of the invention. The parts are by weight except in the case of liquids which are expressed in corresponding parts by volume.

130 parts of formyl guanidine, 103 parts of formamide, and 1.8 parts of sodium hydroxide were mixed in a distilling apparatus. The reaction mixture was heated in a metal bath at 160° C. until a clear melt resulted. The temperature was then raised rapidly to 250° C. and held there until distillation stopped. The crude 2-amino-1,3,5-triazine crystallized readily from the distillate and was collected by filtration. A good yield of the purified product was obtained by crystallization from water.

In the foregoing example the reaction was carried out in the presence of sodium hydroxide. Instead thereof potassium hydroxide or other suitable alkali metal hydroxide may be employed. Similarly, the temperatures employed are the preferred ones. However, both the temperature and time of heating may be varied to a considerable extent, and it is expected that reasonable variations can be made in bringing about the condensation reaction.

It is obvious that the above description and examples are intended to be illustrative only and that they may be varied or modified to a considerable extent without departing from the spirit of the invention or sacrificing the advantages thereof. We do not, therefore, intend to limit outselves to the specific embodiments herein set forth except as indicated in the appended claims.

What we claim is:

1. A method for producing 2-amino-1,3,5-triazine which comprises reacting formyl guanidine with formamide.

2. The process for producing 2-amino-1,3,5-triazine which comprises reacting formyl guanidine with formamide in the presence of an alkali metal hydroxide.

3. The process for producing 2-amino-1,3,5-triazine which comprises reacting formyl guanidine with formamide in the presence of sodium hydroxide.

4. The process for producing 2-amino-1,3,5-triazine which comprises heating a mixture of formyl guanidine, formamide, and an alkali metal hydroxide.

5. The process for producing 2-amino-1,3,5-triazine which comprises heating a mixture of formyl guanidine, formamide, and sodium hydroxide at a temperature of about 160° C. until a clear melt is obtained and subsequently subjecting to distillation at a temperature of about 250° C.

JACKSON P. ENGLISH.
JOSEPH H. PADEN.